United States Patent [19]

McBee

[11] Patent Number: 4,930,299
[45] Date of Patent: Jun. 5, 1990

[54] MULTI-DIRECTIONAL SINGLE PIVOT FOR A COTTON HARVESTER DUCT

[75] Inventor: Steve H. McBee, Ankeny, Iowa

[73] Assignee: Deere & Company, Moline, Ill.

[21] Appl. No.: 367,400

[22] Filed: Jun. 15, 1989

[51] Int. Cl.⁵ ............................................. A01D 46/10
[52] U.S. Cl. ........................................... 56/30; 56/31; 56/12.9
[58] Field of Search .................. 56/12.1, 12.9, 13.1, 56/13.2, 13.3, 14.2, 28, 30, 31, 41

[56] References Cited

U.S. PATENT DOCUMENTS

| | | |
|---|---|---|
| 4,221,508 | 9/1980 | Haines ............................ 56/13.3 X |
| 4,249,365 | 2/1981 | Hubbard et al. . |
| 4,803,830 | 2/1989 | Junge et al. . |
| 4,817,370 | 4/1989 | Deutsch et al. .......................... 56/41 |
| 4,821,497 | 4/1989 | Deutsch et al. .......................... 56/41 |

OTHER PUBLICATIONS

John Deere 9940 Cotton Picker Parts Catalog (PC-1800), Nov. 16, 1983, pp. 140-2 and 140-5.

Primary Examiner—Jerome W. Massie
Assistant Examiner—Matthew Smith

[57] ABSTRACT

A single pivot and ledge structure located on the back wall of a lower duct of cotton harvester duct structure supports an upper telescoping duct section and facilitates free movement of the sections relative to each other, for example, when the row unit which is serviced by the duct is moved transversely or raised and lowered relative to the harvester frame. The pivot includes a bushing which extends rearwardly from an angle forming a ledge on the lower duct section. The upper duct section extends over the lower duct section and includes a U-shaped bracket which rests on the ledge. An aperture in the U-shaped bracket is received over the bushing to help position the duct sections and permit free pivoting of the upper duct section in both the fore-and-aft and the transverse directions.

18 Claims, 2 Drawing Sheets

MULTI-DIRECTIONAL SINGLE PIVOT FOR A COTTON HARVESTER DUCT

BACKGROUND OF THE INVENTION

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Illinois 61265, U.S.A., together with all rights to file, and to claim priorities in connection with, corresponding patent applications in any and all foreign countries in the name of Deere & Company or otherwise.

1. Field of the Invention

The present invention relates generally to cotton harvester duct structure, and more specifically to support structure for the cotton-conveying ducts leading from adjustable row units to the cotton basket.

2. Background of the Invention

A cotton harvester such as the John Deere model 9950 Cotton Picker includes a plurality of row harvesting units transversely spaced at the forward end of the harvester with multi-sectioned telescoping ducts extending upwardly from the row units to the harvester basket. A telescoping upper duct section is pivotally connected to the corresponding lower duct section for rocking with respect thereto about a generally transverse axis. Free movement of the row unit vertically and horizontally relative to the harvester frame may be severely hampered by the pivotal connection of the ducts. For example, the lack of flexibility occasioned by the pivotal connections is a limiting factor on the distance the row units can be lowered during shipment of the harvester. The row units on some recently developed harvesters such as the John Deere model 9960 Picker are movable relatively easily in the transverse direction for servicing or for adjusting for differing row spacings, and the lack of flexibility of the duct structure has been a continuing problem. In addition, the numerous combinations of row unit placement that are available with the new machines has increased the problems of inflexibility of the duct support structures. To utilize the transverse adjustment features of the machines to the fullest extent has sometimes required that the duct sections first be disconnected from each other. Binding of the duct sections can also occur when the row units are raised and lowered in certain row unit configurations with presently available duct support structures. Therefore, adequately supporting the duct structure while providing sufficient degrees of movement to accommodate the various movements and positioning of the row units has been a continuing problem.

BRIEF SUMMARY OF THE INVENTION

It is therefore an object of the present invention to provide an improved support structure for the cotton-conveying ducts of a cotton harvester. It is a further object to provide such a structure which is more flexible than at least most previously available support structures. It is yet another object to provide such a structure which is relatively simple in construction and yet provides good support for the ducts.

It is another object of the present invention to provide an improved support structure for the cotton-conveying ducts of a cotton harvester which facilitates relative movement between duct sections about more than one axis. It is still another object to provide such a structure having a single connecting area providing a substantial degree of freedom of movement between the sections to facilitate both transverse and vertical movement of the harvester row units without the need to disconnect the ducts.

It is a further object of the present invention to provide an improved support structure for cotton harvester ducts including a single connecting area between duct sections which facilitates substantial relative pivotal movement between sections. It is a further object to provide such a structure which is relatively simple and yet sturdy in construction. It is still another object to provide such a structure which has good support characteristics.

In accordance with the above objects, duct support structure is provided including a bushing projecting rearwardly from an angle bracket or stiffener connected to the back wall of a lower duct portion of the cotton harvester. The corresponding upper duct portion extends over the lower duct portion and includes a U-shaped bracket which rests on a horizontal flange of the angle bracket. The bushing projects through the bight portion of the U-shaped bracket to maintain the upper duct in position over the lower duct while permitting limited movement of the duct portions relative to each other about both fore-and-aft and transverse axes.

The duct support is relatively sturdy and yet simple in construction and facilitates a substantial amount of both horizontal and vertical movement of the harvester row units without having to disconnect the duct portions from each other. The angle bracket support helps maintain freedom of movement of the duct portions about the pivot bushing without binding and excessive wear of the bushing. Lower row unit shipping positions and numerous row unit configurations as well as servicing positions can be accommodated more easily with the ducts connected.

These and other objects, features and advantages of the invention will become apparent to one skilled in the art upon reading the following detailed description in view of the drawings.

DETAILED DESCRIPTION OF THE PREFERRED EMBODIMENT

Figure 1:
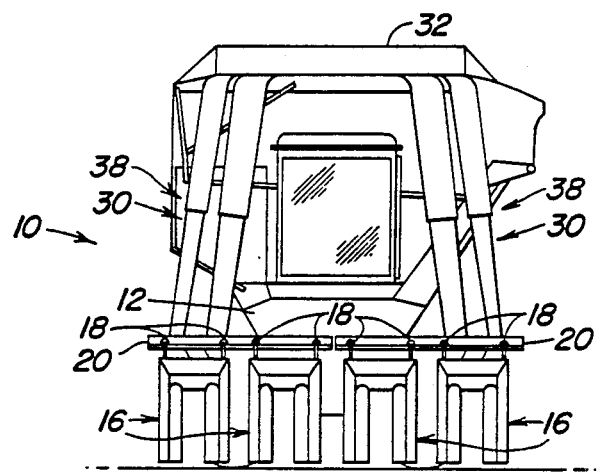
FIG. 1 is a front view of a cotton harvester with cotton conveying duct structure attached thereto.

Referring now to FIG. 1, therein is shown a cotton harvester 10 having a main frame 12 supported for forward movement over a field of cotton planted in parallel rows. Row harvesting units 16 are supported by roller assemblies 18 from the forward end of the frame 12 from rail structure 20. The rail structure, in turn, is connected by vertically moveable lift arm structure 22 to the frame 12. The support arrangement for the row units 16 is preferably of the type shown and described in U.S. Pat. No. 4,803,830 and provides a substantial amount of transverse adjustment for servicing the units and adjusting the units for differing row spacings.

Cotton conveying duct structure 30 extends upwardly and rearwardly from the row units 16 to a cotton basket 32 supported on the main frame 12. Air nozzle structure 34 (FIG. 2) opens into the duct structure 30 to direct air upwardly and propel harvested cotton from the row units 16 toward the basket 32. The duct structure 30 telescopes at locations 38 to facilitate vertical movement of the row units 16 and/or the movement of the top of the duct structure vertically with the basket. As can be appreciated from Figs. 1 and 2, these vertical movements as well as any transverse movements of the row units 16 will cause a change of attitude of the duct structure.

Figure 2:
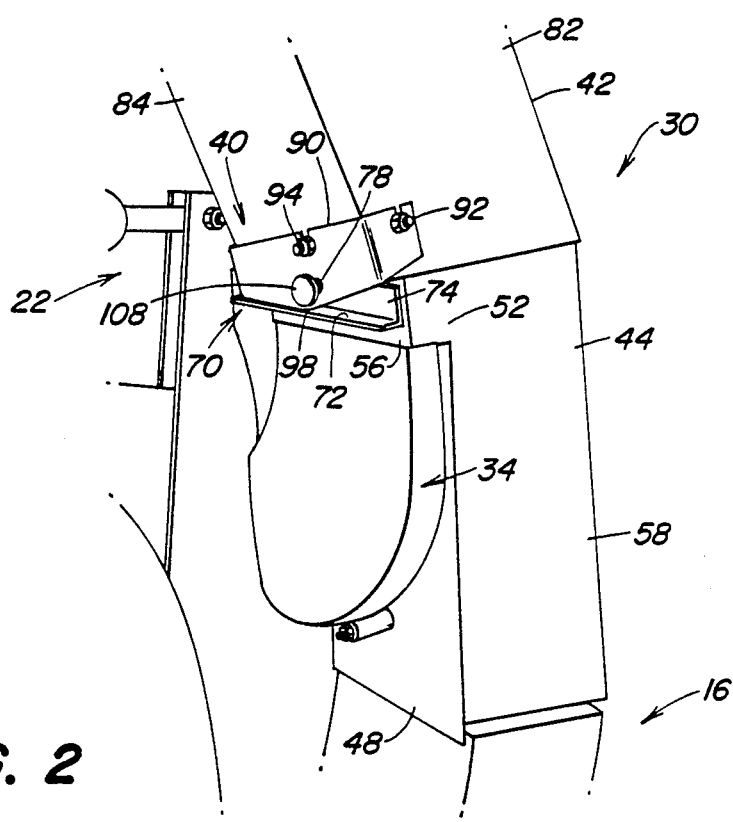
FIG. 2 is a rear perspective view of a portion of the duct structure showing the connection between the upper and lower ducts.
Figure 3:
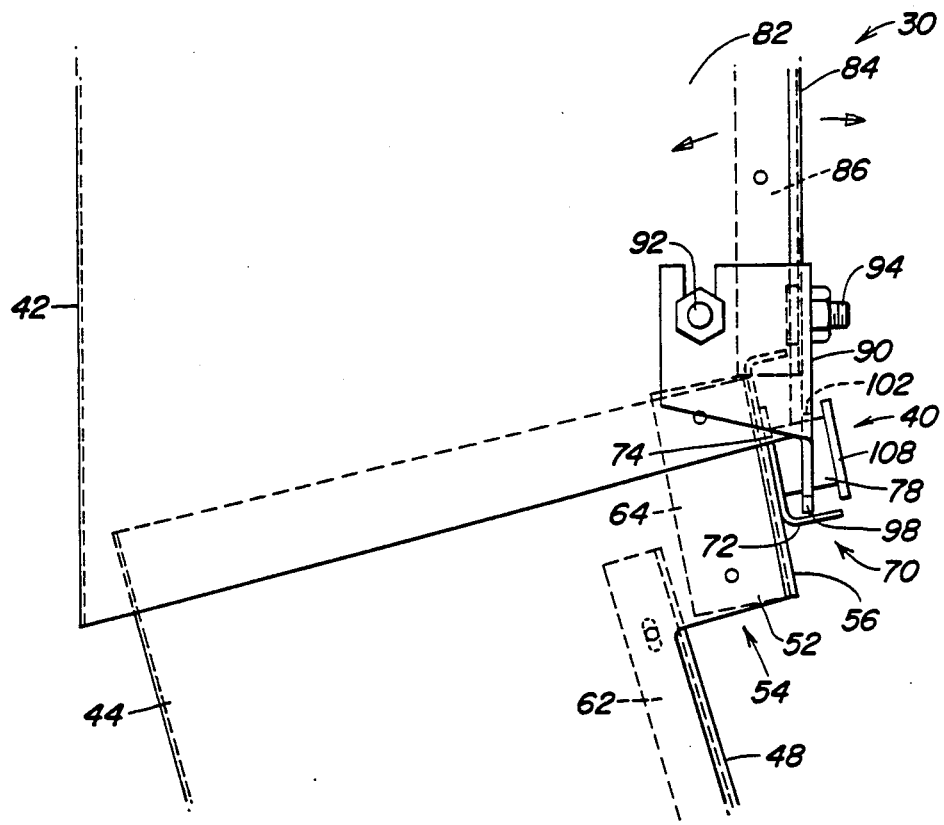
FIG. 3 is a side view of the connection shown in FIG. 2.

To accommodate the change of attitude of the duct structure 30 without need to disconnect the ducts, duct support structure indicated generally at 40 in FIGS. 2 and 3 is provided. As shown in the drawings, the duct structure 30 includes an upper and lower duct portions 42 and 44 of rectangular cross-section. The upper duct portion 42 is slightly larger than and extends over the lower duct portion 44 (Fig. 3). The lower duct portion 44, as shown in FIG. 2, may be fixed to the unit support structure for vertical movement with the rail 20. Alternatively, the lower duct portion 44 may be fixed directly to the row unit 24 for movement both vertically and transversely with the row unit.

The upper end of the lower duct portion 44 extends rearwardly from rear wall 48 at location 52 to define an upwardly opening nozzle-receiving area 54 with a narrow rear wall section 56 extending between sidewalls 58. The lower duct portion 44 is strengthened by corner angles 62 and 64 (FIG. 3) located at the rear corners adjacent the wall 48 and wall section 56, respectively.

An angle bracket 70 includes a generally horizontal flange 72 defining a support ledge, and an upright flange 74 extending along and fixed to the rear wall section 56. A bushing or pivot 78 is fixed to and extends rearwardly from the central portion of the flange 74.

The upper duct portion 42 includes sidewalls 82 and a rear wall 84 extending between the sidewalls. Strengthening angles 86 are fixed to the rear corners and extend upwardly from the lower end of the duct structure 42. A U-shaped bracket 90 opens forwardly around the lower rear of the duct portion 42 and is connected to the sidewalls 82 and the rear wall 84 by bolts 92 and 94, respectively. The bracket 90 tapers to rounded nadir 98 located centrally between the sidewalls 82 and slightly below the lowermost edge of the duct portion 42. The bracket 90 is apertured at a location 102 just above the nadir 98. The aperture 102 is received over the cylindrical portion of the bushing or pivot 78 and has a diameter larger than the bushing so that the bracket 90 is free to pivot about both fore-and-aft and transverse axes. As best seen in FIG. 3, the nadir 98 rests on the ledge structure 72 so that a substantial portion of the vertical load presented by the upper duct portion 42 is borne by the angle bracket 70 and so that the bracket 90 can move freely relative to the bushing 78. The bushing 78 includes an enlarged end 108 having a diameter greater than that of the aperture 102 to prevent the bracket 90 from moving rearwardly off the bushing 78 and to maintain the nadir 98 on the ledge structure 72.

The upper duct portion 42 is free to pivot from side to side relative to the lower duct portion 44 generally about the fore-and-aft axis of the bushing 78 (see FIG. 2 wherein duct portion 42 is pivoted to the left). The upper duct portion 42 is also free to rock fore-and-aft (see the arrows of FIG. 3) relative to the lower duct portion 44. Therefore, a substantial amount of relative transverse and vertical movement can be accommodated by the support structure 40. The air nozzle structure 34 is conveniently received adjacent the opening 54 to direct air upwardly into the upper duct portion 42 at a location near the area of overlap between the portions 42 and 44.

Having described the preferred embodiment, it will become apparent to one skilled in the art that various modifications may be made to the above-described structure without departing from the scope of the invention as set forth in the claims below.

I claim:

1. In a cotton harvester having a row harvesting unit supported at the forward end of a main frame and moveable with respect to the frame, cotton conveying duct structure for directing cotton removed from the cotton rows by the units upwardly to a cotton receptacle, the duct structure including an upper duct portion and a lower portion connected for movement with the row unit, means for supporting the upper duct portion from the lower portion while providing free movement of the row unit relative to the upper duct portion, the means for supporting including pivot structure having a single pivot location for facilitating relative movement between the upper duct portion and lower portion about at least two axes as the row unit is moved.

2. The invention as set forth in claim 1 wherein the pivot structure includes a bushing projecting outwardly from one of the portions and a bracket connected to the other portion and received on the bushing.

3. The invention as set in claim 2 wherein the bushing projects from the lower portion, the bracket is apertured, and the aperture is received on the bushing.

4. The invention as set forth in claim 3 wherein the lower portion includes ledge structure and the bracket is supported on the ledge structure.

5. The invention as set forth in claim 1 wherein the upper duct portion includes a lowermost section, the lower portion includes an uppermost duct section received within the lowermost section, and the means for supporting includes a generally horizontal surface, wherein the lowermost section is supported on the horizontal surface.

6. The invention as set forth in claim 4 wherein the horizontal support comprises a flange of an angle bracket, the angle bracket connected to the uppermost section of the lower duct and supporting the pivot structure.

7. The invention as set forth in claim 6 wherein the pivot structure comprises a single bushing projecting from the angle bracket, and wherein the lowermost section includes an apertured bracket received by the bushing.

8. In a cotton harvester having a row harvesting unit supported at the forward end of a main frame and moveable with respect to the frame, cotton conveying duct structure for directing cotton removed from the cotton rows by the units upwardly to a cotton receptacle, the duct structure including an upper duct portion and a lower duct portion connected for movement with the row unit, means for supporting the upper duct portion from the lower duct portion while providing for substantial free movement of the row unit relative to the upper duct portion, the means for supporting including ledge structure connected to the lower duct portion and a bracket connected to the upper duct portion and resting on the ledge structure.

9. The invention as set forth in claim 8 further comprising pivot means connected between the upper and lower duct portions adjacent the ledge structure for pivotally connecting the duct sections for rocking relative to each other about both fore-and-aft and transversely extending axes.

10. The invention as set forth in claim 9 wherein the pivot means includes a single bushing projecting from the lower duct portion through the bracket.

11. The invention as set forth in claim 10 wherein the bushing is connected to the ledge structure.

12. The invention as set forth in claim 8 wherein the bracket includes a rounded lower ledge-contacting portion having an aperture, and further comprising a bushing connected to the ledge structure and projecting through the aperture.

13. The invention as set forth in claim 8 wherein the upper duct portion is received over the lower duct portion, said ledge structure limiting downward movement of the upper duct portion relative to the lower duct portion.

14. The invention as set forth in claim 13 further comprising pivot structure connected between the ledge structure and the bracket structure.

15. The invention as set forth in claim 14 wherein the pivot structure and bracket structure are located on the rear side of the duct structure.

16. The invention as set forth in claim 15 further comprising an air nozzle, and means for supporting the air nozzle forwardly adjacent the ledge structure.

17. In a cotton harvester having a row harvesting unit supported at the forward end of a main frame by a vertically moveable lift and support structure, walled duct structure for directing cotton removed from the cotton rows by the units upwardly to a cotton receptacle, the duct structure including an upper duct portion and a lower duct portion, the lower duct portion connected for movement with the lift and support structure, means pivotally supporting the upper duct portion in overlying relationship with respect to the lower duct portion for providing for substantial rocking of the duct portions relative to each other about at least two different axes.

18. The invention as set forth in claim 17 wherein the means pivotally supporting includes a pivot extending outwardly from one wall of the lower duct and a bracket connected to a corresponding adjacent wall of the upper duct and supported by the pivot for rocking about two mutually transverse axes.

* * * * *